United States Patent
Raghunathan (10) Patent No.: US 9,436,221 B2
(45) Date of Patent: Sep. 6, 2016

(54) MULTIPLE CONNECTOR ELECTRONICS DOCKING BASE DEVICE

(71) Applicant: Balaji Raghunathan, Foothill Ranch, CA (US)

(72) Inventor: Balaji Raghunathan, Foothill Ranch, CA (US)

( * ) Notice: Subject to any disclaimer, the term of this patent is extended or adjusted under 35 U.S.C. 154(b) by 0 days.

(21) Appl. No.: 14/933,045

(22) Filed: Nov. 5, 2015

(65) Prior Publication Data

US 2016/0124464 A1    May 5, 2016

Related U.S. Application Data

(60) Provisional application No. 62/075,680, filed on Nov. 5, 2014.

(51) Int. Cl.
*H05K 5/00* (2006.01)
*G06F 1/16* (2006.01)
*H01R 27/00* (2006.01)
*H01R 31/06* (2006.01)

(52) U.S. Cl.
CPC .............. *G06F 1/1632* (2013.01); *H01R 27/00* (2013.01); *H01R 31/065* (2013.01)

(58) Field of Classification Search
USPC .................................. 361/752, 807; 439/529
See application file for complete search history.

(56) References Cited

U.S. PATENT DOCUMENTS

| | | | |
|---|---|---|---|
| 7,287,738 B2 * | 10/2007 | Pitlor | H02G 3/20 248/205.4 |
| 7,966,723 B2 | 6/2011 | Basham et al. | |
| 8,068,336 B2 | 11/2011 | Crooijmans et al. | |
| 2004/0150963 A1 * | 8/2004 | Holmberg | A61B 8/00 361/741 |
| 2005/0055487 A1 | 3/2005 | Tanaka et al. | |
| 2007/0026694 A1 | 2/2007 | Mayer | |
| 2007/0135157 A1 | 6/2007 | Kuo et al. | |
| 2012/0014056 A1 | 1/2012 | Chen et al. | |
| 2013/0058036 A1 | 3/2013 | Holzer et al. | |
| 2014/0097793 A1 | 4/2014 | Wurtz et al. | |

* cited by examiner

*Primary Examiner* — Andargie M Aychillhum (57) ABSTRACT

A multiple connector electronics docking base device includes a housing structured to have a slot extending into an upper surface of the housing. A disc is rotatably coupled to the housing and partially positioned within the slot wherein a selectable portion of the disc is positionable to be exposed within the slot. Each of a plurality of base connectors is coupled to the disc. The base connectors are spaced on the disc such that a selectable one of the base connectors is positionable within the slot. A first end of a wire is coupled to the disc such that each base connector is electrically coupled to the wire. A second end of the wire is coupled to the housing such that the second end is configured for being electrically coupled to a power source.

20 Claims, 7 Drawing Sheets

MULTIPLE CONNECTOR ELECTRONICS DOCKING BASE DEVICE

CROSS-REFERENCE TO RELATED APPLICATIONS

This application claims benefit of the provisional application Ser. No. 62/075,680 filed on Nov. 5, 2014.

BACKGROUND OF THE DISCLOSURE

Field of the Disclosure

The disclosure relates to docking base devices and more particularly pertains to a new docking base device for docking, charging and communicative connection of a selectable extrinsic electronic device through a single docking base.

SUMMARY OF THE DISCLOSURE

An embodiment of the disclosure meets the needs presented above by generally comprising a housing structured to have a slot extending into an upper surface of the housing. A disc is rotatably coupled to the housing and partially positioned within the slot wherein a selectable portion of the disc is positionable to be exposed within the slot. Each of a plurality of base connectors is coupled to the disc. The base connectors are spaced on the disc such that a selectable one of the base connectors is positionable within the slot. A first end of a wire is coupled to the disc such that each base connector is electrically coupled to the wire. A second end of the wire is coupled to the housing such that the second end is configured for being electrically coupled to a power source.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 8 thereof, a new docking base device embodying the principles and concepts of an embodiment of the disclosure and generally designated by the reference numeral 10 will be described.

As best illustrated in FIGS. 1 through 8, the multiple connector electronics docking base device 10 generally comprises a housing 12 configured for positioning on a support surface 14. The housing 12 is structured to have a slot 16 extending into an upper surface 18 of the housing 12. The slot 16 has a pair of parallel straight sides 20 and a flat bottom side 22. The flat bottom side 22 is parallel to a bottom face 24 of the housing 12 and perpendicular to the straight sides 20. A drum 26 is coupled to the housing 12. The drum 26 is rotatable in the housing 12 and has a top face defining a disc 28 wherein the disc 28 rotates relative to the housing 12. The disc 28 is partially positioned within the slot 16 wherein a selectable portion of the disc 28 is positionable to be exposed within the slot 16. Each of a plurality of apertures 30 extends through the disc 28.

Each of a plurality of base connectors 32 is coupled to the disc 28. Each base connector 32 may be of a unique type configured for coupling to respective connection mechanisms for various types and brands of extrinsic electronic devices. Each of the base connectors 32 extending through an associated one of the apertures 30. The base connectors 32 are radially spaced on the disc 28 such that a selectable one of the base connectors 32 is positionable within the slot 16. One of the base connectors 32 is exposed in the slot 16 at a time and positioned to insert into the extrinsic electronic device at least partially extending into the slot 16. The base connectors 32 pass through a pair of parallel spaced slits 36 when the disc 28 is rotated relative to the housing 12.

A wire 38, or wires, have a first end 40 and a second end 42. The first end 40 is coupled to the disc 28 and moves with the disc 28 such that each base connector 32 is electrically coupled to the wire 38. The second end 42 of the wire 38 is coupled to the housing 12 through a circuit board 44 positioned in the housing 12 such that the second end 42 is configured for being electrically coupled to a power source 46. Thus, each of the base connectors 32 is electrically coupled to the circuit board 44. Each of a pair of stops 50 is coupled to and extends from a peripheral edge 52 of the drum 26. The stops 50 are spaced around the drum 26 such that the stops 50 contact pegs 52 to limit rotation of the drum 26 preventing twisting or disconnection of the wire 38. Alignment nubs 80 extend from the drum 26. The alignment nubs 80 are positionable to be engaged by a seat 82 coupled to the housing 12. Each alignment nub 80 corresponds to an associated one of the base connectors 32 such that the associated base connector 32 is exposed in the slot 16 when the alignment nub is engaged by the seat 82.

A port 48 is coupled to the housing 12. The port may be a conventional connector such as a universal serial bus port, a mini usb port, or the like. The port 48 is electrically coupled to the circuit board 44 wherein the port 48 is electrically coupled to each base connector 32. There may be one or more such ports 48 each electrically coupled to the circuit board 44.

A cover 54 is pivotally coupled to the housing 12 in alignment with the disc 28. The cover 54 is pivotable between a covering position 56 and an elevated position 58. A hinge 76 is provided which may be of conventional structure to support the cover 54 in the elevated position 58 until moved into the covering position 56. In the covering position 56, the cover 54 covers at least a portion of the slot 16 over the disc 28. In the elevated position 58 the cover 54 is positioned exposing the selectable portion of the disc 28 exposed within the slot 16 to provide access to the base connector 32 positioned in the slot 16. The cover 54 is substantially planar. Each of a pair of flanges 60 is coupled to and extends from the cover 54. The flanges 60 extend into the slot 16 when the cover 54 is in the covering position 56. Each flange 60 is complementary in shape to the slot 16 wherein the flanges 60 and the cover 54 enclose the selectable portion of the disc 28 exposed within the slot 16 while the cover 54 is in the covering position 56.

An extension 68 may be slidably extendable from a rear side 70 the housing 12. The extension 68 has a pair of parallel tracks 72 into which pins 74 extend. The extension 68 is extendable the from the housing 12 the length of the tracks 72 to stabilize the housing 12 when the extrinsic electronic device is inserted into the slot 16.

Figure 1:
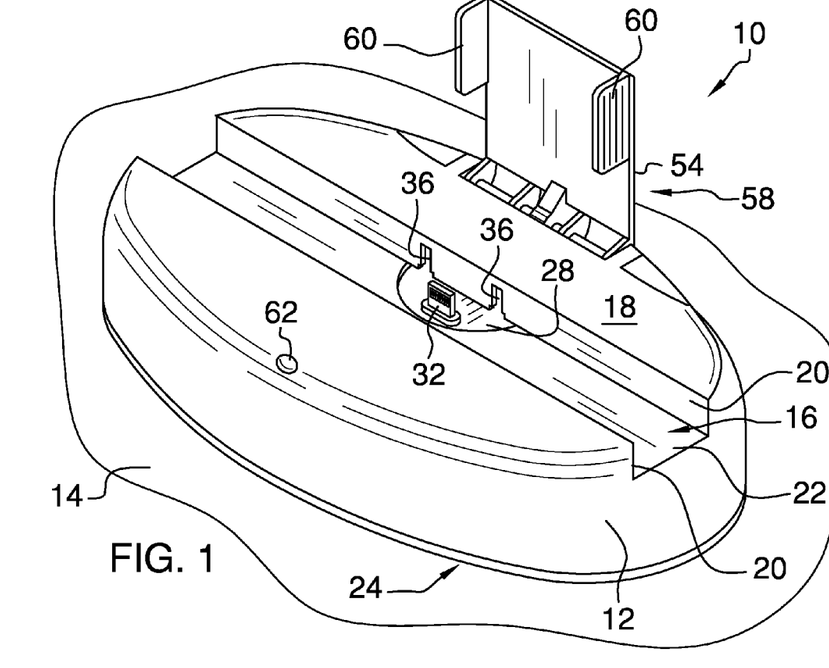
FIG. 1 is a top front side perspective view of a multiple connector electronics docking base device according to an embodiment of the disclosure.
Figure 2:
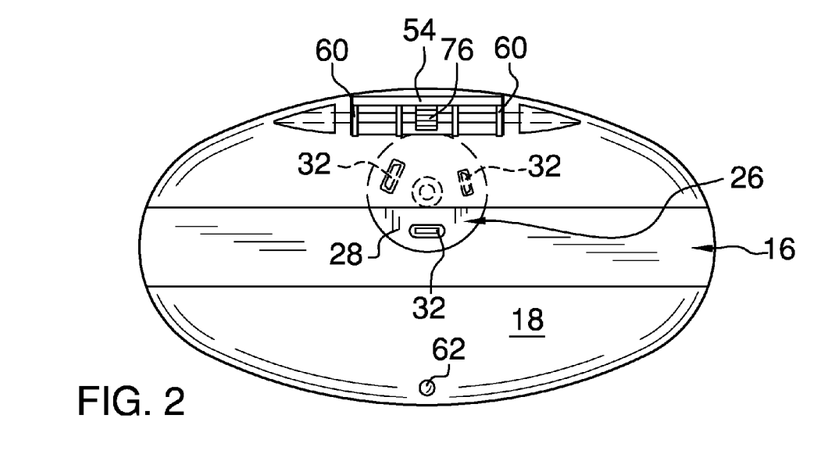
FIG. 2 is a top view of an embodiment of the disclosure.
Figure 3:
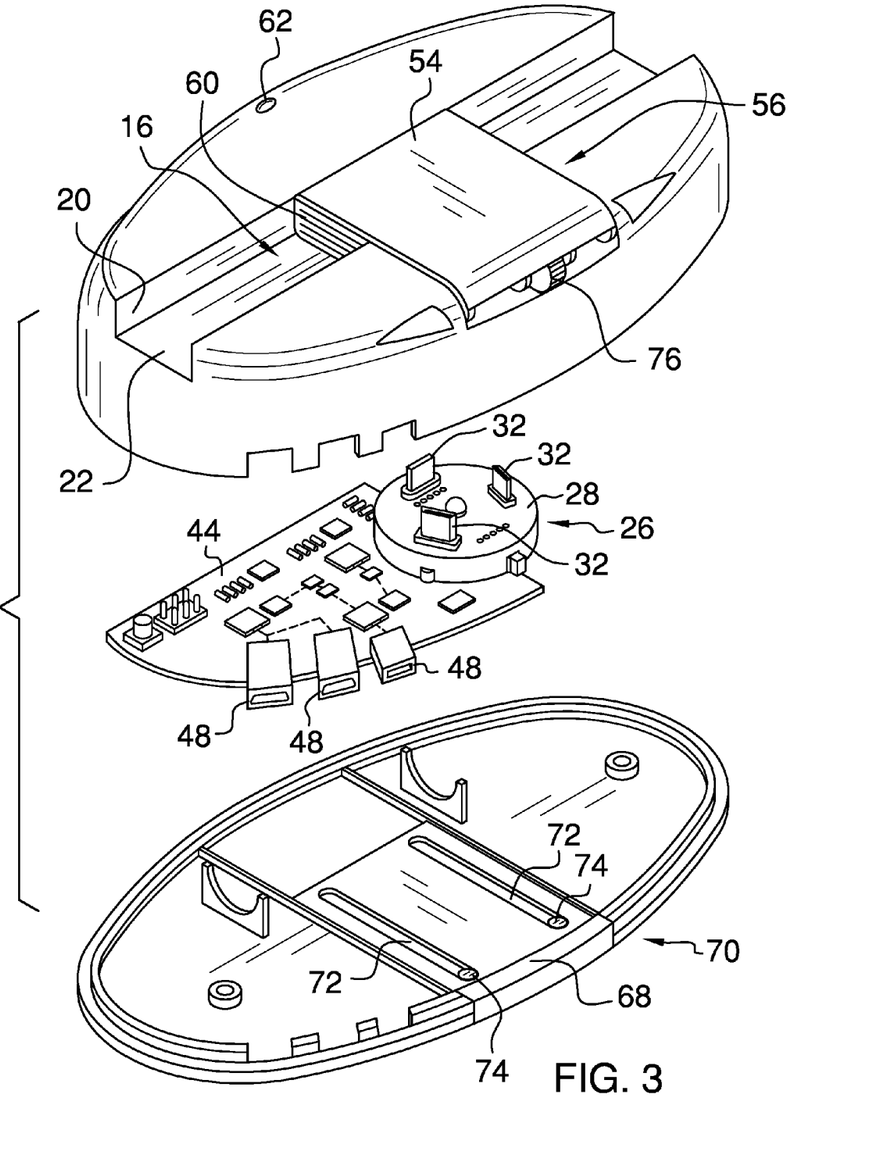
FIG. 3 is an exploded top rear side view of an embodiment of the disclosure.
Figure 4:
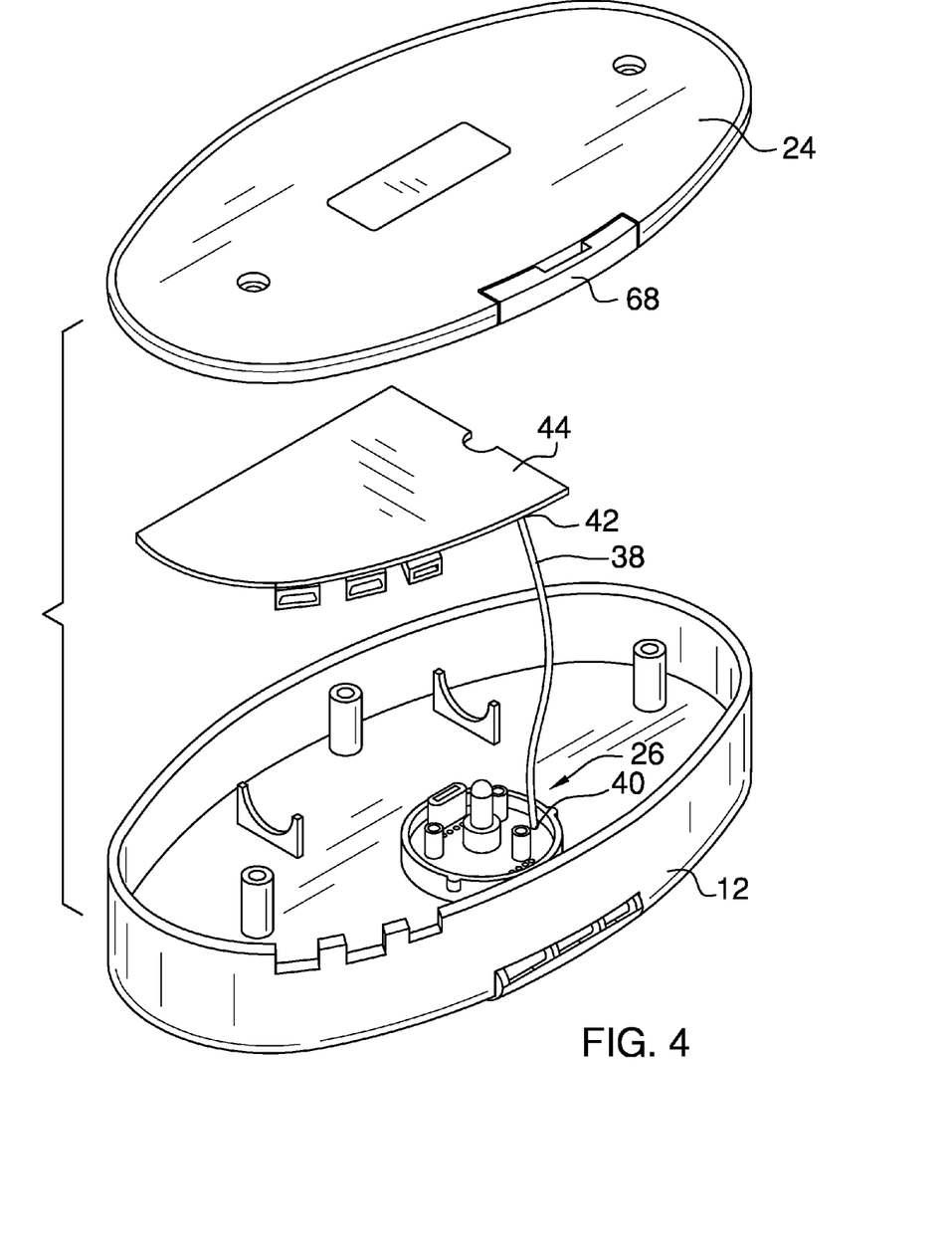
FIG. 4 is an exploded bottom rear side view of an embodiment of the disclosure.
Figure 5:
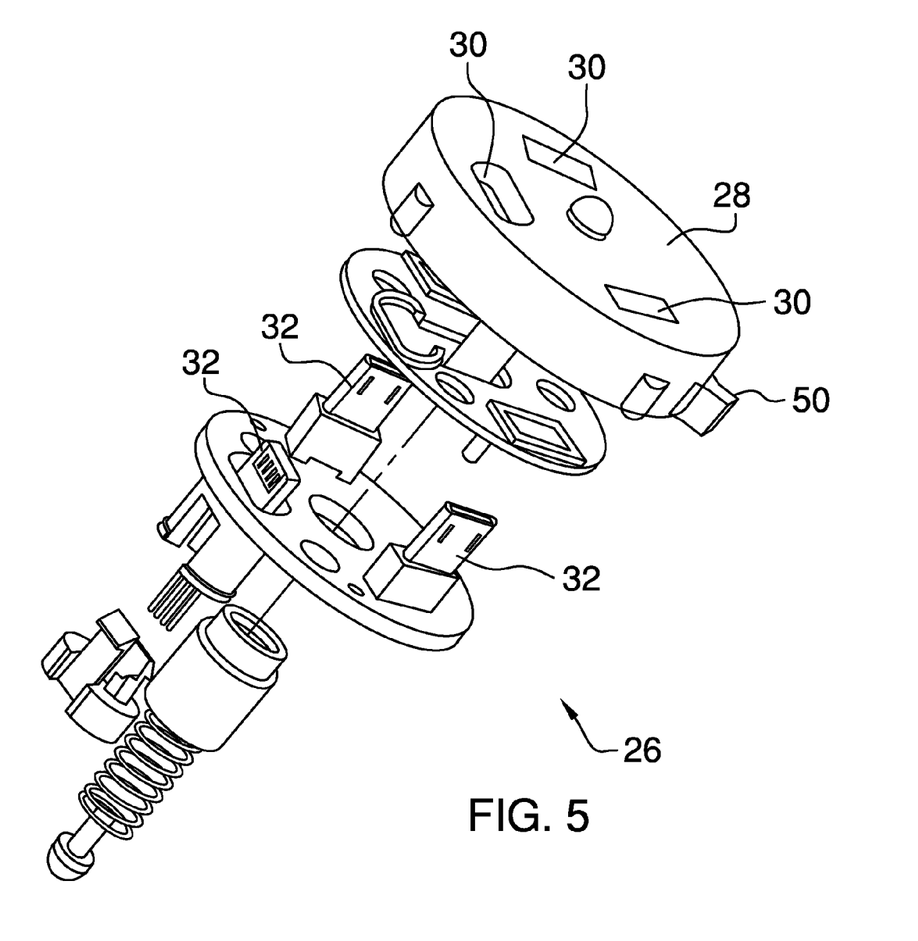
FIG. 5 is an exploded view of a drum assembly of an embodiment of the disclosure.
Figure 6:
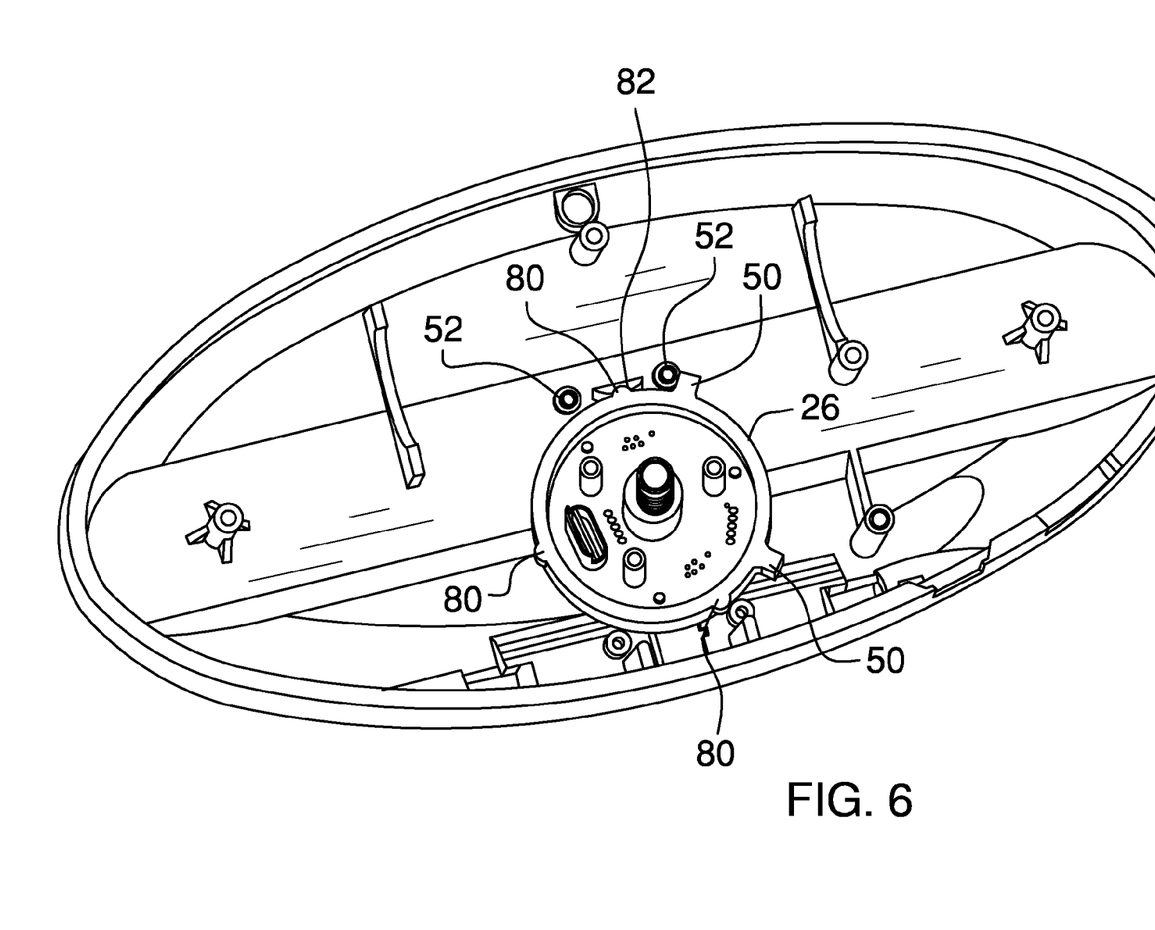
FIG. 6 is a bottom view of a drum assembly in a housing of an embodiment of the disclosure.
Figure 7:
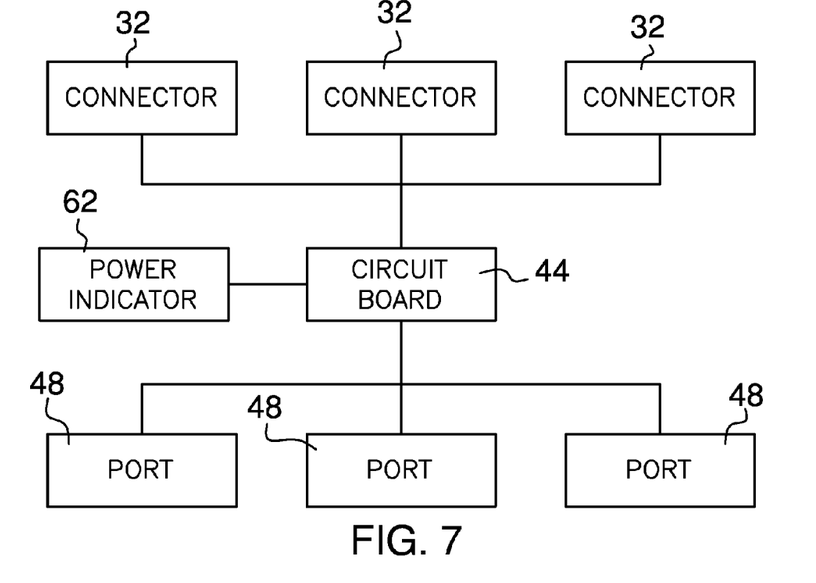
FIG. 7 is a schematic view of an embodiment of the disclosure.
Figure 8:
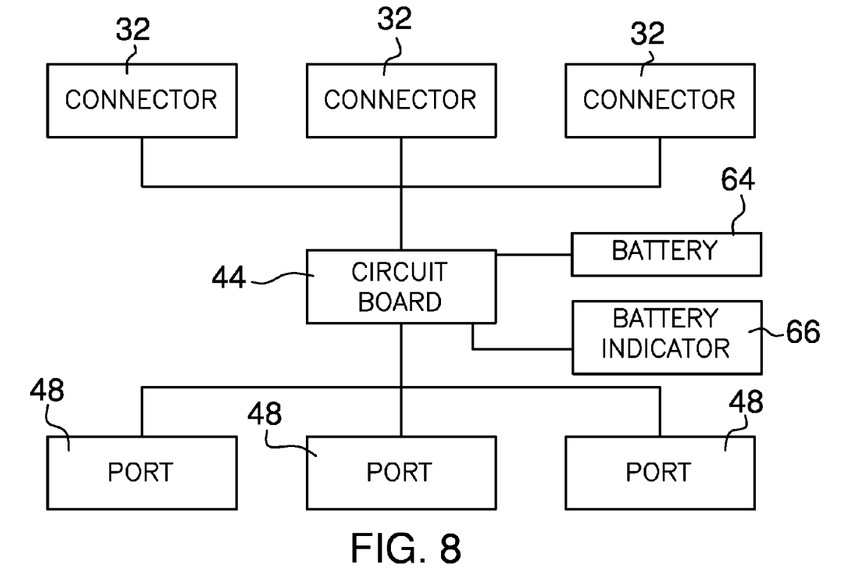
FIG. 8 is a schematic view of a battery powered embodiment of the disclosure.
Figure 9:
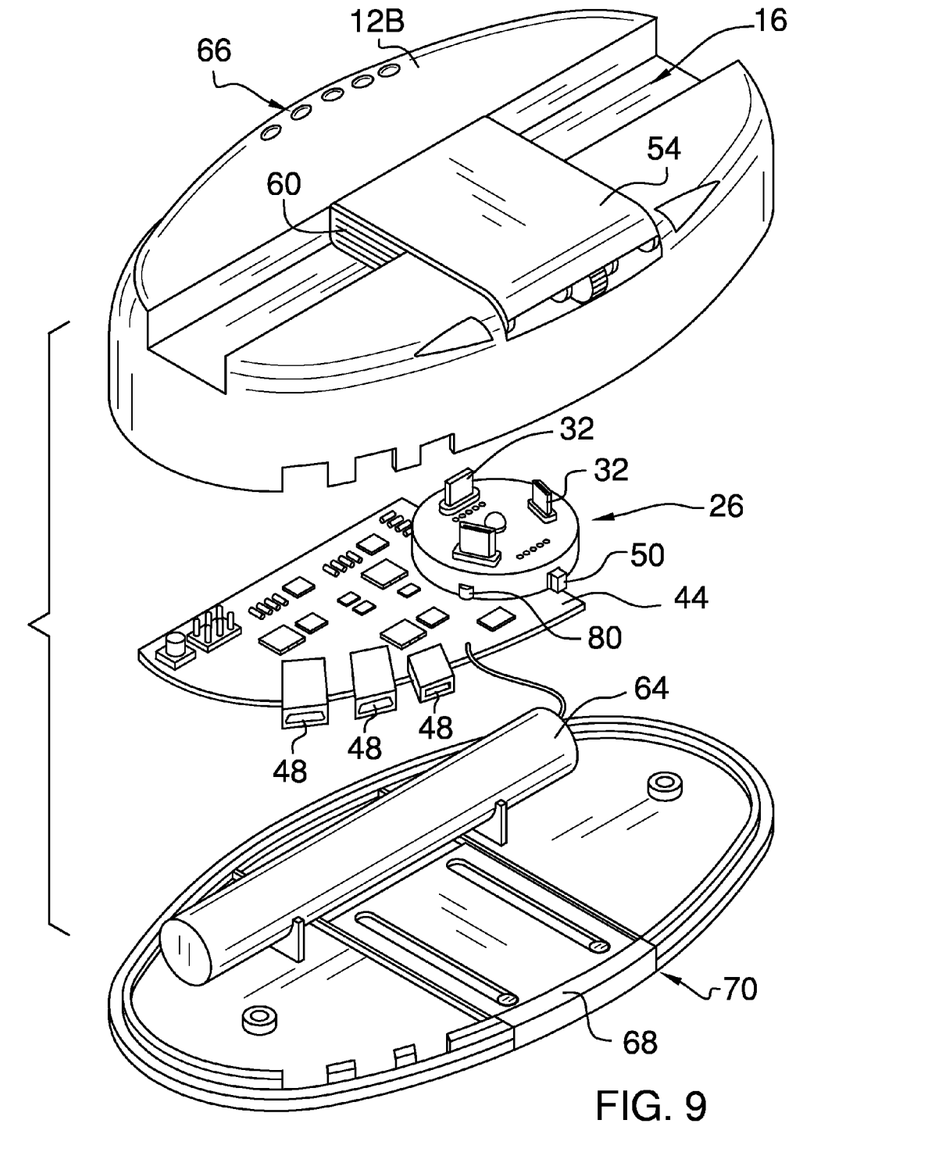
FIG. 9 is an exploded top rear side perspective view of a battery powered embodiment of the disclosure.

The device 10 is provided in a wired power embodiment, shown in FIGS. 1 through 7, and a battery powered embodiment as shown in FIGS. 8 through 9. In the wired power embodiment described above, a power indicator 62 is coupled to and exposed to be visible on the housing 12. The power indicator 62 is operationally coupled to the circuit board 44 wherein the power indicator 62 is configured to provide visible indication of electrical power being provided to the external device coupled to one of the base connectors 32 from an external power source coupled to the port 48.

In the battery powered embodiment, a battery 64 is positioned in the housing 12B. The battery 64 is electrically coupled to each base connector 32 through the circuit board 44. The battery 64 is also electrically coupled to the port 48 to allow for recharging of the battery 64. A battery indicator 66 is coupled to and exposed to be visible on the housing 12B. The battery indicator 66 is operationally coupled to the circuit board 44 wherein the battery indicator 66 indicates a power level of the battery 64. The battery indicator 66 may be a plurality of lights 68 which illuminate in a conventional manner to indicate a power level of the battery 64.

In use, the housing 12 is positioned in a desired location. When desired, the cover 54 is moved to the elevated position 58 exposing the selectable one of the base connectors 32 appropriate for the external electronic device. The external electronic device is then inserted into the slot 16 to engage the selected base connector 32 to the external electronic device. The external electronic device is then recharged through connection to an external power source through the port 48 or through the battery 64 depending on the embodiment and configuration being employed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple connector electronics docking base device comprising:
    a housing configured for positioning on a support surface, said housing being structured to have a slot extending into an upper surface of said housing;
    a drum coupled to said housing, said drum being rotatable in said housing, said drum having a top face defining a disc wherein said disc rotates relative to said housing, said disc being partially positioned within said slot wherein a selectable portion of said disc is positionable to be exposed within said slot;
    a plurality of base connectors coupled to said disc, said base connectors being spaced on said disc such that a selectable one of said base connectors is positionable within said slot; and
    a wire having a first end and a second end, said first end being coupled to said disc such that each said base connector is electrically coupled to said wire, said second end of said wire being coupled to said housing such that said second end is configured for being electrically coupled to a power source.

2. The device of claim 1, further comprising said slot having a pair of parallel straight sides and a flat bottom side.

3. The device of claim 2, further comprising a pair of parallel spaced slits, said base connectors passing through said slits when said disc is rotated relative to said housing.

4. The device of claim 2, further comprising a pair of stops coupled to and extending from a peripheral edge of said drum, said stops being spaced around said drum such that said stops limit rotation of said drum.

5. The device of claim 1, further comprising said base connectors being radially spaced on said disc.

6. The device of claim 1, further comprising:
    a circuit board positioned in said housing;
    a plurality of apertures extending through said disc;
    each of said base connectors extending through an associated one of said apertures, each of said base connectors being electrically coupled to said circuit board.

7. The device of claim 6, further comprising a port coupled to said housing, said port being electrically coupled to said circuit board wherein said port is electrically coupled to each said base connector.

8. The device of claim 7, further comprising a power indicator coupled to and exposed to be visible on said housing, said power indicator being operationally coupled to said circuit board wherein said power indicator is configured to provide visible indication of electrical power being provided to an external device coupled to one of said base connectors from an external power source coupled to said port.

9. The device of claim 1, further comprising a cover, said cover being pivotally coupled to said housing in alignment with said disc, said cover being pivotable between a covering position wherein said cover covers said slot over said disc and an elevated position exposing said selectable portion of said disc exposed within said slot.

10. The device of claim 9, further comprising said cover being substantially planar.

11. The device of claim 10, further comprising a pair of flanges coupled to and extending from said cover, said flanges extending into said slot when said cover is in said covering position, each said flange being complementary to said slot wherein said flanges and said cover enclose said selectable portion of said disc exposed within said slot.

12. The device of claim 1, further comprising a battery positioned in said housing, said battery being electrically coupled to each said base connector.

13. The device of claim 12, further comprising a rotatable drum coupled to said housing, said disc being a top face of said rotatable drum, said base connectors being radially spaced on said disc.

14. The device of claim 13, further comprising a pair of parallel spaced slits, said base connectors passing through said slits when said disc is rotated relative to said housing.

15. The device of claim 13, further comprising a pair of stops coupled to and extending from a peripheral edge of said drum, said stops being spaced around said drum such that said stops limit rotation of said drum.

16. The device of claim 12, further comprising:
a circuit board positioned in said housing;
a plurality of apertures extending through said disc;
each of said base connectors extending through an associated one of said apertures, each of said base connectors being electrically coupled to said circuit board.

17. The device of claim 16, further comprising a port coupled to said housing, said port being electrically coupled to said circuit board wherein said port is electrically coupled to said battery wherein said port is configured for coupling to an external power source for charging said battery.

18. The device of claim 16, further comprising a battery indicator coupled to and exposed to be visible on said housing, said battery indicator being operationally coupled to said circuit board wherein said battery indicator indicates a power level of said battery.

19. The device of claim 12, further comprising:
a cover, said cover being pivotally coupled to said housing in alignment with said disc, said cover being pivotable between a covering position wherein said cover covers said slot over said disc and an elevated position exposing said selectable portion of said disc exposed within said slot, said cover being substantially planar; and
a pair of flanges coupled to and extending from said cover, said flanges extending into said slot when said cover is in said covering position, each said flange being complementary to said slot wherein said flanges and said cover enclose said selectable portion of said disc exposed within said slot.

20. A multiple connector electronics docking base device comprising:

a housing configured for positioning on a support surface, said housing being structured to have a slot extending into an upper surface of said housing, said slot having a pair of parallel straight sides and a flat bottom side, said flat bottom side being parallel to a bottom face of said housing;
a drum coupled to said housing, said drum being rotatable in said housing, said drum having a top face defining a disc wherein said disc rotates relative to said housing, said disc being partially positioned within said slot wherein a selectable portion of said disc is positionable to be exposed within said slot;
a plurality of apertures extending through said disc;
a plurality of base connectors coupled to said disc, each of said base connectors extending through an associated one of said apertures, said base connectors being spaced on said disc such that a selectable one of said base connectors is positionable within said slot, said base connectors being radially spaced on said disc;
a pair of parallel spaced slits, said base connectors passing through said slits when said disc is rotated relative to said housing;
a wire having a first end and a second end, said first end being coupled to said disc such that each said base connector is electrically coupled to said wire, said second end of said wire being coupled to said housing such that said second end is configured for being electrically coupled to a power source;
a circuit board positioned in said housing, each of said base connectors being electrically coupled to said circuit board;
a port coupled to said housing, said port being electrically coupled to said circuit board wherein said port is electrically coupled to each said base connector; a pair of stops coupled to and extending from a peripheral edge of said drum, said stops being spaced around said drum such that said stops limit rotation of said drum;
a cover, said cover being pivotally coupled to said housing in alignment with said disc, said cover being pivotable between a covering position wherein said cover covers said slot over said disc and an elevated position exposing said selectable portion of said disc exposed within said slot, said cover being substantially planar;
a pair of flanges coupled to and extending from said cover, said flanges extending into said slot when said cover is in said covering position, each said flange being complementary to said slot wherein said flanges and said cover enclose said selectable portion of said disc exposed within said slot; and
a power indicator coupled to and exposed to be visible on said housing, said power indicator being operationally coupled to said circuit board wherein said power indicator is configured to provide visible indication of electrical power being provided to an external device coupled to one of said base connectors from an external power source coupled to said port.

* * * * *